US012783147B2

(12) United States Patent
Siddulugari et al.

(10) Patent No.: US 12,783,147 B2
(45) Date of Patent: Nov. 3, 2026

(54) STORAGE VOLUME CHANGES FOR STATEFULSETS

(71) Applicant: Salesforce, Inc., San Francisco, CA (US)

(72) Inventors: Hemanth Siddulugari, Dublin, CA (US); Anila Kumar Garimella, Milpitas, CA (US); Varun Shah, Fremont, CA (US)

(73) Assignee: Salesforce, Inc., San Francisco, CA (US)

( * ) Notice: Subject to any disclaimer, the term of this patent is extended or adjusted under 35 U.S.C. 154(b) by 307 days.

(21) Appl. No.: 18/744,093

(22) Filed: Jun. 14, 2024

(65) Prior Publication Data

US 2025/0383808 A1 Dec. 18, 2025

(51) Int. Cl.
*G06F 3/06* (2006.01)

(52) U.S. Cl.
CPC ............ *G06F 3/065* (2013.01); *G06F 3/0604* (2013.01); *G06F 3/0614* (2013.01); *G06F 3/067* (2013.01)

(58) Field of Classification Search
CPC ...... G06F 3/065; G06F 3/0604; G06F 3/0614; G06F 3/067
See application file for complete search history.

(56) References Cited

U.S. PATENT DOCUMENTS

| | | | | |
|---|---|---|---|---|
| 7,577,722 | B1 * | 8/2009 | Khandekar | G06F 9/45558 718/1 |
| 8,352,608 | B1 * | 1/2013 | Keagy | G06F 8/63 709/225 |
| 9,110,732 | B1 * | 8/2015 | Forschmiedt | G06F 9/5077 |
| 9,170,798 | B2 * | 10/2015 | Nagaraja | G06F 3/0486 |
| 9,547,485 | B2 * | 1/2017 | Suzuki | G06F 9/45558 |
| 10,601,679 | B2 * | 3/2020 | Lynar | G06F 3/0647 |
| 2009/0288084 | A1 * | 11/2009 | Astete | G06Q 30/02 718/1 |
| 2012/0096460 | A1 * | 4/2012 | Sekiguchi | G06F 9/4856 718/1 |

(Continued)

OTHER PUBLICATIONS

Statefulsets, retrieved Jun. 14, 2024, pp. 1-8, https://kubernetes.io/docs/concepts/workloads/controllers/statefulset/.

*Primary Examiner* — Douglas M Slachta
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed pertaining to modifying storage properties of application pods in a computing environment. A computer system may receive an update to a set of storage properties associated with a deployment of application pods coupled to storage volumes that satisfy the storage properties. The computer system performs a volume conversion process to replace the application pods with ones coupled to storage volumes that satisfy an updated set of storage properties corresponding to the update. The volume conversion process involves transitioning a particular application pod into a suspended state in which the pod is unavailable for data access and replicating data associated with the particular application pod to at least one other application pod. After replicating the data, the computer system deletes the particular pod to trigger a deployment system to provision a replacement application pod coupled to a storage volume satisfying the updated set of storage properties.

20 Claims, 6 Drawing Sheets

(56) References Cited

U.S. PATENT DOCUMENTS

| | | | | |
|---|---|---|---|---|
| 2013/0036128 | A1* | 2/2013 | Ben-Tsion | G06F 13/00 707/756 |
| 2013/0185420 | A1* | 7/2013 | Shimogawa | H04L 12/4645 709/224 |
| 2019/0012110 | A1* | 1/2019 | Okano | G06F 3/0659 |
| 2019/0278624 | A1* | 9/2019 | Bade | G06F 9/4868 |
| 2021/0263762 | A1* | 8/2021 | Kachare | G06F 3/0658 |
| 2023/0147295 | A1 | 5/2023 | Guttapalem et al. | |
| 2024/0095085 | A1 | 3/2024 | Garimella et al. | |

* cited by examiner

STORAGE VOLUME CHANGES FOR STATEFULSETS

BACKGROUND

Technical Field

This disclosure relates generally to computer systems and, more specifically, to various mechanisms for modifying storage properties in container orchestration platforms without data loss.

Description of the Related Art

Enterprises routinely deploy their applications on a cloud infrastructure that is provided by a cloud provider, such as Amazon™. The cloud provider often provisions virtual machines (VMs) and storage volumes to be utilized by the applications that are deployed (as application containers) onto those VMs. An application container (or, simply "container") comprises a set of applications and their dependencies, all of which are packaged into a portable, self-sufficient unit. Once a container is generated, it can be deployed onto a VM such that the application(s) included in the container are executed. In various cases, a large-scale deployment system, such as Kubernetes™, is used to automate the deployment, scaling, and management of application containers across multiple VMs. A large-scale deployment system can maintain information about the resources (e.g., VMs and storage volumes) available to it and utilize that information to deploy application containers onto those resources.

Modern systems routinely enable users to store a collection of information as a database that is organized in a manner that can be efficiently accessed and manipulated. In many cases, the data of that database is stored within a database store that is implemented and managed by a storage service. A database service typically processes database transactions to read and write data while the storage service works to ensure that the results from those database transactions are stored in the database store in a manner that can be efficiently accessed. The storage service can comprise multiple storage applications that enable data to be accessed more efficiently and that serve to prevent data loss by replicating data.

DETAILED DESCRIPTION

Figure 1:
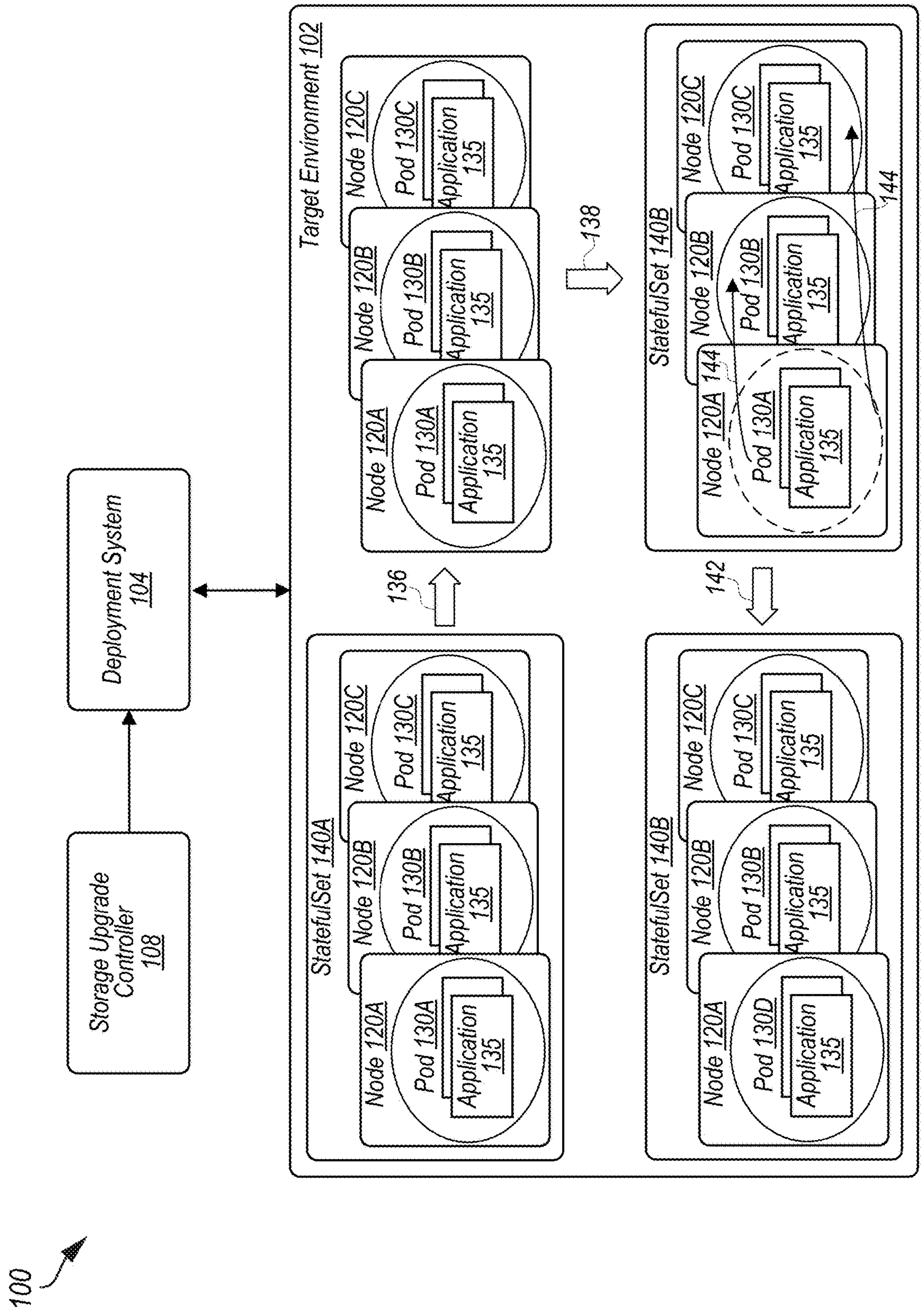
FIG. 1 is a block diagram illustrating example elements of a system that enables storage properties for application pods to be updated, according to some embodiments.

Modern cloud computing systems often utilize container orchestration platforms (e.g., Kubernetes) to manage their deployment, scaling, and operation of containerized applications. These platforms can automate the allocation of computing resources, ensuring efficient use of hardware and software resources. For example, Kubernetes can interact with cloud computing services (e.g., Amazon Web Services™) to provision a VM along with a storage volume (e.g., an Amazon Elastic Block Store (EBS) volume) that is accessible to the application(s) executing on the VM. Accordingly, Kubernetes can deploy a storage application onto the VM and enable that storage application to use the storage volume.

Storage volumes in these environments are typically managed through abstractions like persistent volumes (PVs) and persistent volume claims (PVCs). A PV can include information about an underlying storage volume, such as its type, storage size, and access path. A PVC of a pod (a group of one or more containers) identifies, among other things, the type and the size of the storage volume desired by the container(s). When Kubernetes identifies a PV that meets the requirements of the PVC, it binds the PV to the PVC and thus the containers of the pod are permitted to use the storage volume. One or more pods can be managed together by Kubernetes as part of a statefulset (a Kubernetes object/construct). The pods of a statefulset are created in accordance with the same specification that can specify (e.g., via a reference to a storage class) a set of storage properties (e.g., a volume size, a volume type, etc.) that affects which storage volumes are used for the pods. When a pod is being readied for deployment, Kubernetes creates the PVC for the pod based on the set of storage properties.

After the pods of a statefulset have been deployed into a computing environment, it can be desirable to change the storage volumes that are used by those pods. As an example, as the amount of data being stored increases, it may be desirable to couple the pods to larger storage volumes. But orchestration platforms, such as Kubernetes, do not support direct modifications to many of the storage properties in an existing deployment. To change the storage volumes in the Kubernetes context, Kubernetes requires a process of scaling down the pods, deleting the corresponding PVCs, and then recreating pods with a new specification. When the PVCs are deleted, the corresponding storage volumes are deallocated and their stored data is discarded. As a result, this approach can lead not only to significant downtime but also to the loss of data for various applications (e.g., storage servers) that require continuous availability and data integrity. These challenges are significant due to Kubernetes' use of statefulsets to manage stateful applications, and its current limitations in modifying storage properties without data loss or downtime. This disclosure addresses, among other things, the problem of how to modify the storage properties associated with pods of a statefulset without data loss.

The present disclosure addresses one or more of these challenges by providing a method for dynamically modifying storage properties of stateful applications managed by a container orchestration platform (e.g., Kubernetes) without causing data loss or other significant service disruptions. In various embodiments described below, a system detects an update to a set of storage properties associated application pods and performs a volume conversion (also pod conversion) process that transitions the application pods into a suspended state, replicates their data to other pods, and then deletes the original pods. This may trigger Kubernetes to provision new application pods on nodes that are coupled to storage volumes having the updated storage properties. In various embodiments, the volume conversion process begins with the deletion of the existing statefulset of the application pods while keeping the application pods orphaned but operational. A new statefulset is created with the updated specification, and the orphaned pods are bound to this new statefulset. Each pod may then be sequentially suspended and have its data replicated (e.g., to one or more target pods from other pods storing copies of that data) and then deleted to allow Kubernetes to provision a replacement pod with the updated set of storage properties. This approach may ensure data integrity and availability of data throughout the conversion process by leveraging Kubernetes' mechanisms for statefulsets and PVCs.

This approach can eliminate the need for scaling down statefulsets and deleting PVCs, thereby preventing data loss and minimizing downtime. For example, by iterating through the pods and replacing them one by one (or in small groups) while ensuring their data is replicated, the system can prevent data loss as opposed to bringing all the pods down at once and replacing them. This approach can also allow for continuous operation of stateful applications, including during the storage property modification process. Further, by automating the replication and re-provisioning of pods, the approach ensures data integrity and high availability, which may be critical for various types of applications (e.g., storage servers). This approach may be cloud-agnostic and idempotent, meaning it may be applied across different cloud environments and can recover gracefully from interruptions. This flexibility and robustness may result in an improvement over existing approaches and provide a reliable and efficient way to manage storage properties for stateful applications in Kubernetes and potentially other container orchestration platforms. In some embodiments, by maintaining high availability and ensuring data integrity, this approach can address the needs of modern distributed applications, enabling seamless updates and scaling in dynamic cloud environments.

Turning now to FIG. 1, a block diagram of a system 100 is shown. In the illustrated embodiment, system 100 includes a set of components that may be implemented via hardware or a combination of hardware and software executing on that hardware. Within the illustrated embodiment, system 100 includes a target environment 102, a deployment system 104, and a storage upgrade controller 108. Also as shown, target environment 102 comprises nodes 120A-C that include pods 130A-D (also application pods), respectively, each of those pods having a set of applications 135. System 100 may be implemented differently than shown. For example, deployment system 104 and storage upgrade controller 108 may be implemented within target environment 102.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system Accordingly, system 100 may execute software routines from various, different users (e.g., providers and tenants of system 100) as well as provide code, web pages, and other data to users, databases, and entities (e.g., a third-party system) that are associated with system 100. In various embodiments, system 100 is implemented using a cloud infrastructure provided by a cloud provider. Consequently, nodes 120, deployment system 104, and/or storage upgrade controller 108 may execute on and utilize the cloud resources of target environment 102 within that cloud infrastructure (e.g., computing resources, storage resources, etc.) to facilitate their operations. As an example, the software for implementing storage upgrade controller 108 may be stored on a non-transitory computer-readable medium of server-based hardware included in a datacenter of the cloud provider and executed in a virtual machine hosted on that server-based hardware. In some cases, components of system 100 are implemented without the assistance of a virtual machine or other deployment technologies, such as containerization. In some embodiments, system 100 is implemented on a local or private infrastructure as opposed to a public cloud.

Target environment 102, in various embodiments, is a collection of resources available for implementing services (e.g., a database service, a storage service, etc.). The resources may include hardware (e.g., central processing units, graphics processing units, disks, etc.) and/or software (e.g., VMs, firewalls, etc.). For example, the resources may include VMs executing on hardware of a cloud provider and storage volumes implemented via storage disks provided by that cloud provider. As mentioned above, system 100 may be implemented using a cloud infrastructure. Consequently, target environment 102 can correspond to at least a portion of the cloud infrastructure provided by a cloud provider (e.g., Amazon Web Services™) and be made available to one or more tenants (e.g., government agencies, companies, individual users, etc.). For cases in which there are multiple tenants using target environment 102, target environment 102 may provide isolation so that the data of one tenant is not exposed (without authorization) to other tenants. In various embodiments, target environment 102 corresponds to the particular resources of a cloud infrastructure that are being used by a certain tenant. Target environment 102 may also be implemented using a private infrastructure. In the illustrated embodiment of FIG. 1, nodes 120A-C execute in target environment 102 and thus can utilize its resources to facilitate their operations.

Deployment system 104, in various embodiments, is a service that can orchestrate the deployment of pods 130 onto the resources of target environment 102. Deployment system 104 may maintain environment information about resources of the cloud infrastructure and the configuration of environments (e.g., target environment 102) that are managed by deployment system 104. Accordingly, the environment information might describe, for example, a set of host machines that make up a computer network, their compute resources (e.g., processing and memory capability), the software programs that are running on those machines, and the internal networks of each of the host machines. In various embodiments, deployment system 104 uses the environment information to deploy applications 135 onto the resources of the cloud. For example, deployment system 104 may access the environment information and determine what resources are available and usable for deploying an application 135. Deployment system 104 may identify available resources and then communicate with an agent that is executing locally on the resources in order to instantiate that application 135 on the identified resources. While deployment system 104 is described as deploying components to a public cloud, deployment system 104 may deploy them to local or private environments that are not provided by a cloud provider.

Kubernetes™ is one example of deployment system 104 and is a platform capable of automating the deployment, scaling, and management of containerized applications. These capabilities are facilitated via services of the Kubernetes platform that include, but are not limited to, a controller manager, a scheduler, and an application programming interface (API) service. Within the Kubernetes context, the controller manager is responsible for running the controllers (e.g., storage upgrade controller 108) that interact with the platform, the scheduler is responsible for ensuring that pods 130 have been assigned to a node 120, and the API service exposes the Kubernetes API to users, controllers, and nodes 120 (e.g., the agents running on the nodes 120) so that they can communicate with the Kubernetes platform and one another. In various embodiments, requests to deploy a pod 130 and/or a statefulset 140 are received (e.g., from users) via the API service.

To handle the deployment, scaling, and management of containerized applications, the Kubernetes platform stores entities called objects. A Kubernetes object serves as a "record of intent" describing a desired state for a deployment. As an example, an object may represent a user's request to deploy a service (a set of applications 135) in a pod 130. A Kubernetes object can identify an object specification and a state. An object specification identifies characteristics of the desired state of a deployment, such as the pod(s) 130 (and their application(s) 135) to be deployed and the resources (e.g., computing, storage, etc.) to be made available to those pods. Deployment system 104 may receive a deploy request to deploy a set of pods 130. That request may specify characteristics about the set of pods 130, such as the application 135 to deploy and the resources to be used by those application. Deployment system 104 may create an object based on the information in the request—in some cases, the request provides the object—and set the state of that object to pending. If the resources that are requested are not available in target environment 102, then the pods 130 are not deployed and remain in a pending state. If the resources are available, then deployment system 104 may deploy the pods 130 and set the state of their object to "active." While Kubernetes is discussed, deployment system 104 may encompass any system used to deploy, manage, and maintain applications within a computing environment. For instance, deployment system 104 may provide the infrastructure and tools to automate the deployment process, manage resources, and ensure the optimal performance and reliability of applications.

Storage upgrade controller 108, in various embodiments, is software that is executable to manage and orchestrate various tasks related to the deployment, scaling, and management of pods 130 in target environment 102. By way of example, storage upgrade controller 108 can interact with deployment system 104 to modify the storage properties associated with pods 130 of target environment 102. As discussed in greater detail below, storage upgrade controller 108 implements at least a portion of a volume conversion process that involves replacing pods 130 with replacement applications pods 130 coupled to storage volumes that satisfy an updated set of storage properties. In the context of Kubernetes, storage upgrade controller 108 may interact with Kubernetes via the Kubernetes API to create, manipulate, and delete objects managed by Kubernetes—e.g., storage upgrade controller 108 may instruct Kubernetes to delete an object corresponding to statefulset 140A.

A node 120, in various embodiments, is a VM that has been deployed onto the resources of target environment 102. A node 120 can be deployed using a node image. A node image, in various embodiments, is a template having a software configuration (which can include an operating system) that can be used to deploy an instance of a VM. Amazon Machine Image (AMI) is one example of a node image. AMI can include snapshots (or a template for the root volume of the instance (e.g., an operating system)), launch permissions, and a block device mapping that specifies the volume(s) to attach to that instance when it is launched. In various embodiments, the software (e.g., applications 135) executing on one node 120 can interact with the software executing on another node 120. For example, a process executing on node 120A may communicate with a process that is executing on node 120B to transfer data from a storage of node 120A to a storage of node 120B. Once a node 120 has been deployed, pods 130 having applications 135 (and potentially other software routines) may then be deployed onto that node 120. In some embodiments, however, a node 120 is a physical machine that has been deployed to target environment 102.

A pod 130, in various embodiments, is a group of containerized applications 135, with shared resources, and a specification for executing the containerized applications. For example, a pod 130 may include a container with a storage service application 135 and a container with a ranking service application 135. In some embodiments, pods 130 are deployed using a large-scale deployment service, such as Kubernetes. Once a node 120 has been deployed and becomes an available resource to Kubernetes, Kubernetes may deploy a requested pod 130 on that node 120. Deploying a pod 130 onto a given node 120 may involve Kubernetes communicating with an agent (e.g., kubelet) residing on that node 120, where the agent triggers the execution of the containerized applications 135 in that pod 130. Kubernetes may use a control plane that can automatically handle the scheduling of pods 130 on the nodes 120 of a cluster included in target environment 102. In various embodiments, a node 120 can support multiple pods 130, and thus Kubernetes may deploy multiple pods 130 onto a node 120. While pods 130 are discussed, in some embodiments, applications 135 can be installed on a node 120 and executed without the use of containerization or a deployment service.

A statefulset 140 (e.g., statefulset 140A, statefulset 140B), in various embodiments, is a group of pods 130 and is represented as a Kubernetes workload API object used to manage stateful applications. By way of example, stateful applications can be applications that maintain a persistent state between different instances and across restarts. In some aspects, a stateful application can retain data about its operations, user interactions, or transactions. Examples of stateful application may include, but are not limited to, databases, web applications, and storage services. In some embodiments, a statefulset 140 may be configured for applications that require unique identifiers, stable storage, and ordered, deterministic deployment and scaling. A statefulset 140 may include an identifier that is maintained across any rescheduling, which may be necessary for applications such as databases or distributed systems where the state may need to be preserved. In some cases, a statefulset 140 may ensure that the network identity of a pod 130 remains consistent and may facilitate the management of storage resources by maintaining persistent volumes (PVs, which will be discussed in further detail with respect to FIG. 2) for each pod 130. Thus, a statefulset 140 may enable applications 135 to retain their state across restarts, failures, and updates.

In various embodiments, a statefulset 140 may include a group of pods 130 deployed according to a specification that defines one or more storage properties, including, but not limited to, a volume size, a volume type, an input/output operations per second (IOPS), and a throughput. Based on this specification, a storage class may be used to dynamically provision storage volumes that satisfy these storage properties. For example, the storage class may define the required IOPS and throughput levels. For each pod 130, deployment system 104 may create a persistent volume claim (PVC) that specifies one or more of the storage properties and then search for storage volumes that satisfy the PVC. Once a storage volume is found, deployment system 104 may bind the PVC to the storage volume so that the corresponding pod 130 may access and utilize the storage volume once deployed In various embodiments, system 100 implements a volume conversion process for modifying one or more storage properties associated with a set of application pods 130 in target environment 102 without losing data. In the illustrated embodiment, deployment system 104 initially manages statefulset 140A, which includes pods 130A-C (although, it may include any number of pods not illustrated in FIG. 1). As will be discussed in further detail with respect to FIG. 2, pods 130A-D may be coupled to a storage volume (e.g., one represented by a PV) that satisfies a current set of storage properties (e.g., as identified by a PVC). When system 100 receives an updated set of storage properties, system 100 may begin the volume conversion process. In some examples, when system 100 receives an updated set of storage properties, it may acquire a lock (also lease) to block all other operations (i.e., all operations honor the lock) and ensure the volume conversion process can proceed without interruptions. The lock process will be discussed in further detail with respect to FIG. 4.

As illustrated by arrow 136, when system 100 receives an updated set of storage properties, statefulset 140A is deleted (e.g., via a request sent from storage upgrade controller 108 to deployment system 104), which results in pods 130A-C becoming orphans (e.g., they are no longer managed as part of a statefulset 140). In various embodiments, pods 130A-C may continue operating normally during this stage (e.g., they may continue processing requests for data). Next, as shown by arrow 138, statefulset 140B is created with the updated set of storage properties and the orphaned pods 130A-C are coupled to statefulset 140B. Pods 130A-C may continue to use volumes that were dynamically provisioned under the previous specification due to the PVCs for those pods 130 remaining intact. Next, the volume conversion may begin, and for each pod 130, the following steps may be executed.

Initially, a particular application pod 130 (e.g., pod 130A) can be transitioned into a suspended state during which the particular application pod 130 is not available for data access. In some examples, transitioning a pod 130 into a suspended state may be performed by writing a marker to a disk associated with that pod 130 and restarting that pod 130. The marker may prevent the pod 130 from completing its boot sequence, thus transitioning it into a suspended state where it is unavailable for data access. This process will be described in further detail with respect to FIG. 4.

As depicted by arrows 144, data replication may occur such that the data associated with the suspended pod 130 (pod 130A in FIG. 1) is replicated to at least one other application pod 130 (e.g., replicated to pod 130B and pod 130C and/or additional pods not illustrated in FIG. 1). In some embodiments, the replicated data may be required to be present on at least a threshold number of pods 130 as per a replication factor, which will be discussed in further detail with respect to FIGS. 3 and 4. As such, the data may be replicated from other pods 130 that store a copy of the data stored at the suspended pod 130 to one or more additional pods 130 such that the replication factor is satisfied.

Following successful data replication, the particular application pod's (pod 130A in FIG. 1) storage object (e.g., its PVC), storage volume, and the pod 130 may be deleted as shown by arrow 142 (e.g., deleted via deployment system 104). This deletion may trigger deployment system 104 to provision a replacement application pod 130 (e.g., pod 130D in FIG. 1) and a new storage volume that can be bound to a storage object with the updated set of storage properties. In some examples, pod 130D may be provisioned on the same node 120A as the original pod 130A (e.g., as illustrated in FIG. 1), maintaining continuity within the existing infrastructure. In some cases, deployment system 104 may allocate a new node for pod 130D (e.g., depending on resource availability and optimization strategies).

In some embodiments, the newly created pod 130 (e.g., pod 130D) can now operate under statefulset 140B with the updated storage properties. The system may verify the health and functionality of the new pod 130 before proceeding to the next pod in statefulset 140B (e.g., pod 130B, pod 130C, and additional pods not illustrated in FIG. 1.), repeating the volume conversion process until all pods are updated. After completing the volume conversion process for all pods 130 of statefulset 140B, in various embodiments, every pod 130 of statefulset 140B is coupled to a storage volume that stratifies the updated storage properties.

Figure 2:
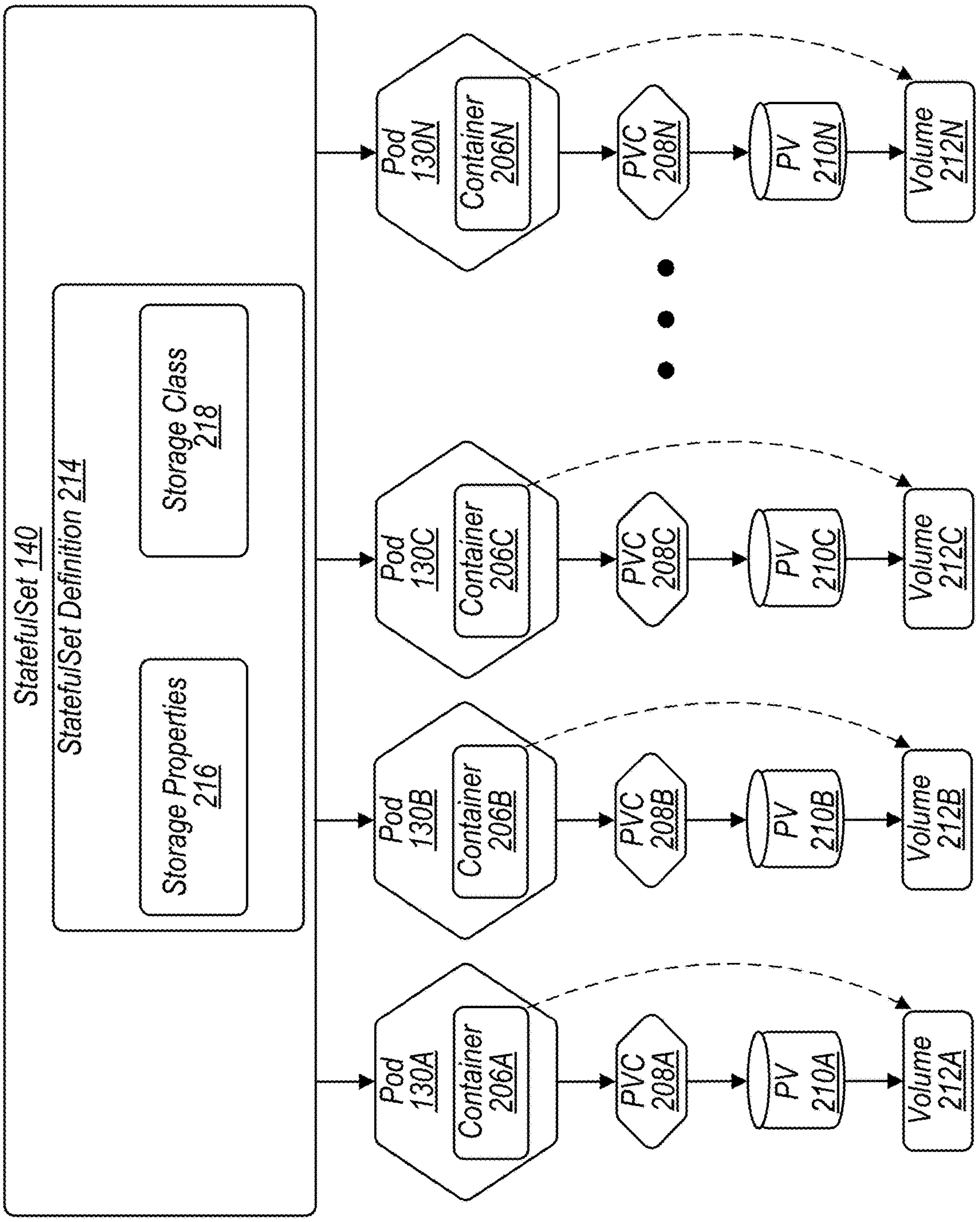
FIG. 2 is a block diagram illustrating example elements of a hierarchical structure that includes a statefulset coupled to a set of application pods, according to some embodiments.

Turning now to FIG. 2, a block diagram of example elements of a hierarchical structure that includes a statefulset 140 that is coupled to a set of application pods 130. In the illustrated embodiment, there is statefulset 140, pods 130A-N, PVCs 208A-N, PVs 210A-N, and volumes 212A-N. As further shown, statefulset 140 includes a statefulset definition 214 that identifies storage properties 216 and a storage class 218. The illustrated embodiment can be implemented differently than shown. For example, storage class 218 may be separate from statefulset 140, and statefulset 140 may include a reference to storage class 218. Furthermore, one or more of storage properties 216 may be specified in storage class 218.

Statefulset definition 214, in various embodiments, is a specification that defines an intended state of statefulset 140. For example, statefulset definition 214 may define statefulset 140 as having five application pods 130 that include respective storage applications, along with resources to be made available to those pods 130. In various embodiments, storage properties 216 detail specific requirements, including, but not limited to, a volume size, a type, an IOPS, and a throughput, that storage volumes 212 must satisfy. Storage class 218 may define a set of performance characteristics that encompass storage properties 216 and that enable the dynamic provisioning of storage based on these characteristics. In some aspects, by defining storage class 218, system 100 can automate the allocation and management of volumes 212 that meet the specified performance requirements detailed in storage objects (e.g., PVCs 208), thereby optimizing the storage for each application pod 130.

In various embodiments, pods 130A-N are managed by statefulset 140, and each pod 130 may include corresponding containers 206 having applications 135. In some examples, pods 130 may include a corresponding label that is used to bind them to statefulset 140 (e.g., pods 130A-C as illustrated in FIG. 1 are bound to statefulset 140A and statefulset 140B via the same set of labels). As shown in FIG. 2, each pod 130 can be associated with a PVC 208, which in turn can be associated with a PV 210 that maps to a volume 212. The dashed arrow between a container 206 and a volume 212 indicate that the container 206 can access the volume 212.

A volume 212, in various embodiments, is a storage area that is usable for storing and accessing data. For example, a volume 212 may be a storage device (e.g., a disk) formatted to store directories and files—thus a volume 212 may be associated with a file system. In various embodiments, a volume 212 is a Non-Volatile Memory Express (NVMe) drive that is available via a VM, although a volume 212 can correspond to any one of a variety of different storage devices (e.g., a hard disk) and be available through other mechanisms. As such, once deployed on that VM, an application container 206 may access that volume 212 through an access path and store its data at that volume 212. In various cases, a volume 212 is a storage volume that is external to a VM but accessible to a container 206 once deployed as part of its pod 130 on that VM.

A PV 210, in various embodiments, is an object representing a volume 212 and includes information about the volume 212, such as its size, access path, etc. In some embodiments, each storage resource that may be used by deployment system 104 is represented by an object understood by deployment system 104. Consequently, PVs 210 can allow deployment system 104 to determine what storage resources exist in target environment 102 and are available for use by the pods 130 that have not yet been deployed. When a storage resource is provisioned, deployment system 104 (or, in some cases, a cloud service that may have provisioned the storage resource) creates a PV 210 for that resource.

A PVC 208, in various embodiments, is an object that corresponds to a request for storage resources (e.g., a volume 212). A PVC 208 may be derived from statefulset definition 214 and linked to a pod 130 of statefulset 140. In various embodiments, a PVC 208 identifies the type and the size of the storage resources desired by a pod 130. Accordingly, a PVC 208 may specify storage properties 216 (some of which may be identified by storage class 218) so that the associated pod 130 will be allocated a volume 212 that satisfies storage properties 216. When deploying the pod 130, deployment system 104 may determine, from PVs 210, whether there are available volumes 212 that satisfy the requirements specified in the PVC 208 of that pod 130. If there is a set of volumes 212 that satisfy that PVC 208, then the deployment system 104 may bind the set of PVs 210 (representing those volumes 212) to that PVC 208 (e.g., via a reference from a PV 210 to the PVC 208 and/or vice versa). As a result, once the pod 130 is deployed, containers 206 of that pod 130 may utilize the underlying set of volumes 212, which they may access using the information (e.g., the access path) specified in the corresponding set of PVs 210.

Figure 3:
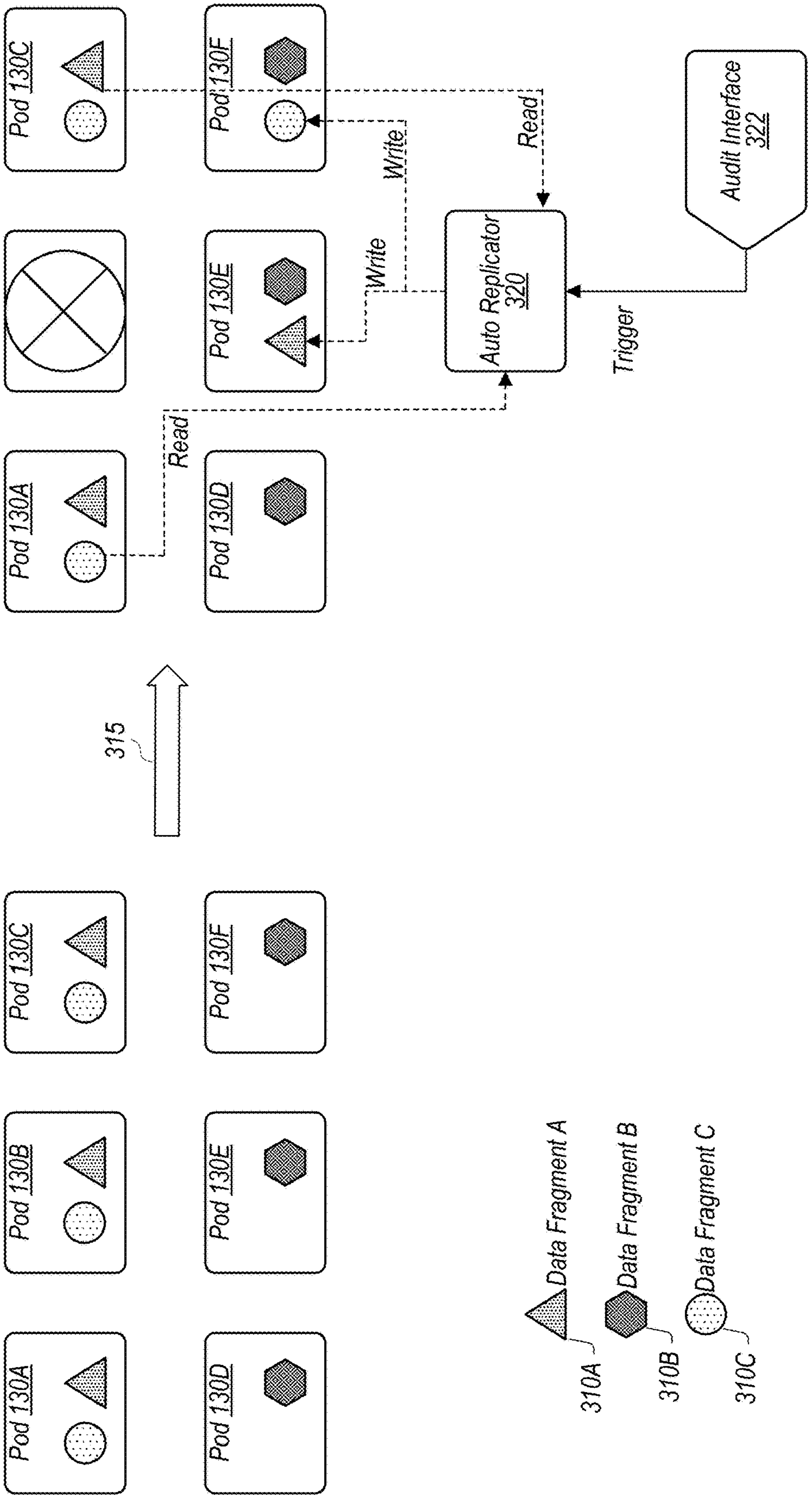
FIG. 3 is a block diagram illustrating example elements that pertain to replicating data among application pods, according to some embodiments.

Turning now to FIG. 3, a block diagram illustrating an example elements pertaining to replicating data among application pods 130 is shown. In the illustrated embodiment, there is an auto replicator 320, an audit interface 322, and pods 130A-F. Also as shown, there are data fragments 310A-310C represent the data that is replicated across pods 130A-F. Initially, pods 130A-C store data fragments 310A and 310C while pods 130D and 130F store data fragment 310B. In the illustrated embodiment, this distribution of data fragments 310 ensures that each data fragment 139 has multiple copies across different pods, adhering to a replication factor of three in FIG. 3.

As mentioned, in various embodiments, the volume conversion process involves a step in which data associated with a suspended pod 130 is replicated to at least one other pod 130. As indicated by arrow 315, the process can involve transitioning from an initial state of pods 130A-F to a new state. As shown, pod 130B becomes unavailable—it may be suspended as part of the volume conversion process and thus its data fragments 310 are no longer accessible. Other example reasons why this may occur may include node failure (e.g., pod 130B may have experienced a failure causing it to lose data fragments), data corruption, configuration changes, and resource constraints. After pod 130B becomes unavailable, an under-replication (e.g., for a replication factor of three) may be detected by auto replicator 320 since pod 130B is no longer available and thus there are no longer three copies of data fragment 310A and 310B that are available. In various embodiments, auto replicator 320 is software that is executable to ensure that there is at least a threshold number of copies of data (e.g., three copies of a data fragment 310 in FIG. 3) that are accessible, e.g., to clients (e.g., database servers) of system 100. Auto replicator 320 may detect under-replication or it may be notified about under-replication via audit interface, which may be an API through which storage upgrade controller 108 and other entities can trigger auto replicator 320. In particular, when a pod 130 is suspended as part of the volume conversion process, storage upgrade controller 108 may notify auto replicator 320 that the pod 130 is suspended and thus there is under-replication in regard to the data fragments 310 of that pod 130. Triggering auto replicator 320 instead of waiting for it to detect under-replication may speed up the volume conversion process.

Upon learning about under-replication, auto replicator 320 may then determine, based on state information describing where data fragments 310 are stored, which data fragments 310 were stored on the pod 130 that is unavailable (pod 130B in FIG. 3). Auto replicator 320 may perform a set of read operations to obtain the under-replicated data fragments 310 from one or more pods 130 storing the other copies and a set of write operations to write the data fragments 310 to one or more other pods 130. When a read operation is performed, it may be performed from any of the pods 130 containing the needed data fragment 310. For example, pod 130A can provide data fragment 310C while pod 130C provides data fragment 310A. Auto replicator 320 may then write these data fragments 310 to one or more other pods 130. As shown in FIG. 3, auto replicator 320 writes data fragment 310A to pod 130E and data fragment 310C to pod 130F. As a result, the replication factor of three is met because there are three copies of data fragments 310A-C. This automated replication process may ensure data consistency and fault tolerance within the distributed system. The use of audit interface 322 may allow system 100 to asynchronously trigger or abort replication processes during the volume conversion process and based on the overall health of target environment 102.

Figure 4:
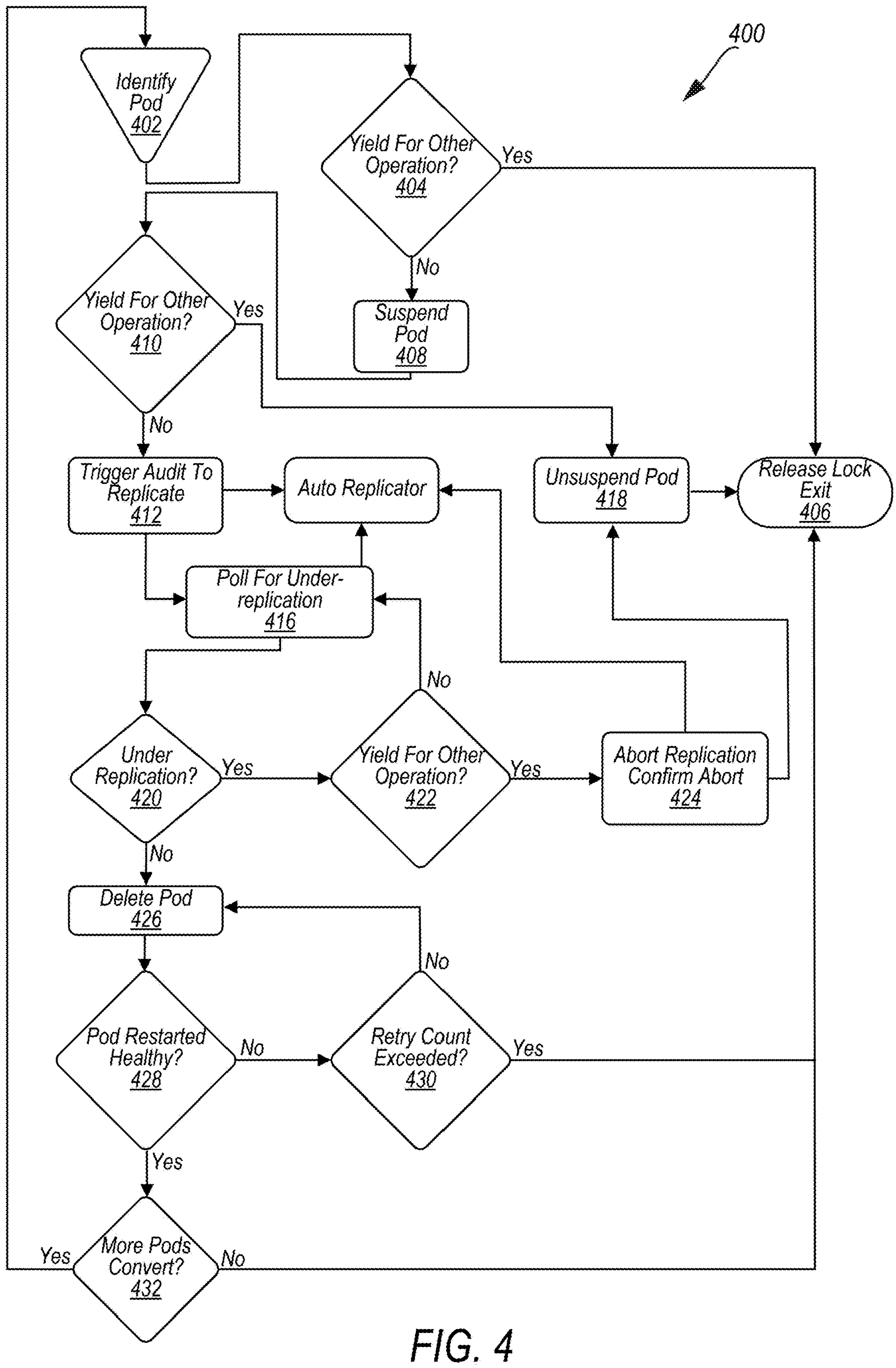
FIG. 4 is a flow diagram illustrating example elements of a volume conversion process, according to some embodiments.

Turning now to FIG. 4, a flow diagram illustrating an example of a volume conversion process 400 is shown. As discussed above with respect to FIG. 1, system 100 can receive an update to the storage properties 216 associated with a statefulset 140 (e.g., the storage volume size may be increased) and acquire a lock on the statefulset 140 and the various resources that are associated with it (e.g., nodes 120) to block other operations (e.g., software upgrades, data backup operations, system maintenance, scaling operations, etc.). The lock may ensure process 400 can proceed without interruptions. System 100 (or, in particular, storage upgrade controller 108) may then perform process 400.

As a part of volume conversion process 400, in response to the update being received, storage upgrade controller 108 may trigger deployment system 104 (e.g., Kubernetes) to delete the existing statefulset 140 (e.g., statefulset 140A in FIG. 1), leaving its pods 130 as orphans. In various embodiments, the pods 130 continue operating normally (e.g., processing requests for data) while orphaned. Storage upgrade controller 108 may then trigger deployment system 104 to create a new statefulset 140 (e.g., statefulset 140B in FIG. 1) with the updated storage properties 216 and the orphaned pods 130 may be bound to the new statefulset 140. In various embodiments, the new statefulset 140 is assigned a label corresponding to the orphaned pods 130 and thus, through the label, the new statefulset 140 is bound to the orphaned pods 130 and vice versa. The pods 130, while bound to the new statefulset 140, may continue to use volumes 212 that were dynamically provisioned under the prior specification of storage properties 216 due to the PVCs 208 for those pods 130 remaining intact.

Next, as a part of volume conversion process 400, storage upgrade controller 108 may begin by working on one pod 130 at a time—this entire process may take several hours, days, or more. At step 402, storage upgrade controller 108 may identify a pod 130 that has not been replaced with another pod 130 that is coupled to a volume 212 that satisfies the updated storage proprieties 216. At step 404, a determination is made whether to yield for another operation (e.g., a higher priority operation). If there is a higher priority operation, then storage upgrade controller 108 yields to the higher priority operation and thus continues to step 406 to release the lock. One example of an operation that may be deemed a higher-priority is an update to the image used to deploy nodes 120 may become available that fixes a bug and therefore storage upgrade controller 108 may yield so that nodes 120 can be upgraded. In various embodiments, storage upgrade controller 108 resumes process 400 after the higher-priority operation has been performed. But if a determination is made to not yield, then process 400 continues to step 408 to suspend the pod 130 identified at step 402.

At step 408, the identified pod 130 is suspended. In various embodiments, suspending a pod 130 may involve writing a marker to a disk association with that pod 130. After writing the marker, the pod 130 may then be restarted. In some aspects, during its boot sequence, the pod 130 may check for the presence of a marker on the disk and if the marker is found, the pod 130 may not complete the normal boot process and instead enter a suspended state where the pod 130 is not fully operational and unavailable for data access. After suspending the pod 130, process 400 continues to step 410.

At step 410, storage upgrade controller 108 may determine whether to yield for another higher-priority or other operation, and if storage upgrade controller 108 makes a determination to yield to an operation, then process 400 continues to step 418 to unsuspend the pod 130 to an unsuspended state in which it resumes its normal operations or full functionality and thus can be available for data accesses. In various embodiments, unsuspending the pod 130 may involve removing the marker from the disk so that the pod 130 can complete its boot sequence. Process 400 then continues to step 406 in which storage upgrade controller 108 releases the lock and aborts or otherwise exits process 400 (e.g., to retry at a later time). But if, at step 410, process 400 does not yield to a higher-priority operation, then process 400 can continue to step 412 in which storage upgrade controller 108 triggers an audit to replicate data associated with the pod 130, the details of which are discussed with respect to FIG. 3. To trigger the audit, storage upgrade controller 108 may notify auto replicator 320 about the suspended pod 130 and that there is under-replication. At step 416, storage upgrade controller 108 may poll for under-replication and, at step 420, determine whether the data associated with the suspended pod 130 has been replicated (i.e., whether there is still under-replication). For example, for a replication factor of three, at step 420, storage upgrade controller 108 may determine (e.g., from replicator 320) whether there are at least three copies of the data associated with the suspended pod 130 in target environment 102 (e.g., there are at least three copies of the data within other pods 130 of the statefulset 140).

At step 420, if a determination is made that there are not enough accessible copies of the pod's data based on the replication factor, then process 400 continues to step 422 to check whether to yield for another (e.g., higher priority) operation. If, at step 422, storage upgrade controller 108 determines to yield for another operation, storage upgrade controller 108 may continue to step 424 to abort the replication process (e.g., by instructing auto replicator 320 to stop replicating the data associated with the suspended pod 130), then, at step 418, unsuspend the pod 130, and at step 406, release the lock and exit process 400. But if, at step 422, storage upgrade controller 108 determines to not yield for another operation, storage upgrade controller 108 may continue to step 416 to poll for under-replication again. In some embodiments, the loop between steps 416, 420, 422, may continue until, at step 420, a determination is made that there are enough copies of the data. If, at step 420, storage upgrade controller 108 determines there are enough copies of the pod's data per the replication factor, process 400 may continue to step 426 to delete the suspended pod 130.

In some embodiments (such as the one illustrated), there is not a determination to yield for another operation between steps 420, 426, 428, 430, and 432 since the amount of time for process 400 to complete at this juncture may be relatively short (compared to the rest of process 400) and thus a higher-priority operation may not have to wait for an extended period of time. The amount of time to complete steps 420, 426, 428, 430, and 432 may be less than the amount of time process 400 may use to replicate data—the replication of the pod's data may take up the majority of the entire volume conversion process 400.

In various embodiments, at step 426, storage upgrade controller 108 starts by marking the pod's associated storage object (e.g., a PVC 208) for deletion. The PVC 208 may prevent the storage volume 212 and its PV 210 from being deallocated in the event that the pod 130 is deleted. Accordingly, the pod deletion process can involve first marking the relevant PVC 208 for deletion, which in turn may allow Kubernetes to deallocate the underlying storage volume 212 and its PV 210 upon the deletion of the suspended pod 130. Kubernetes may use finalizers to ensure that the PVC 208 and the associated storage volume 212 are not deleted until the pod 130 deletion is finalized. Once the pod 130 is deleted, the finalizer may allow the PVC 208 to be deleted. Following the PVC 208 deletion, the storage volume 212 and its PV 210 can then be deleted. This sequence may ensure that the storage resources are properly deallocated. After deleting the pod 130, storage upgrade controller 108 may then trigger the creation of a new pod 130 (e.g., a replacement pod 130) with a new storage object (e.g., a PVC 208) and a newly provisioned storage volume 212 that satisfies the updated set of storage properties. In various embodiments, the new pod 130 is provisioned or created as part of the new statefulset 140 and is coupled to the new storage volume 212, which is dynamically provisioned according to the updated specification.

At step 428, storage upgrade controller 108 verifies or makes a determination about the health and readiness of the new pod 130 before moving on to the next pod 130, ensuring that each pod 130 is successfully updated and operational with the new storage properties. At step 428, if the pod 130 is not restarted healthy, storage upgrade controller 108 may retry restarting the pod 130 and at step 430, if the retry count is exceeded (e.g., the restart attempts are more than a pre-determined threshold), the process 400 may continue to step 406 to release the lock and exit process 400. If, at step 430, the retry count is not exceeded, process 400 may return to step 426 to delete the pod 130 and provision another replacement pod 130. If, at step 428, the pod 130 is restarted healthy, process 400 may continue to step 432 to determine if there are more pods 130 to convert (e.g., determine if there are more pods within the statefulset 140 that require volume conversion). If there are more pods to convert, process 400 may return to step 402 and begin the volume conversion process for the subsequent pod 130. If there are no more pods to convert, process 400 may continue to step 406 to release the lock and exit process 400.

In some cases, during process 400, system 100 may receive a subsequent update to one or more of the storage properties 216 associated with the new statefulset 140. Storage upgrade controller 108 may restart process 400 even if there are remaining pods 130 that have not been replaced with pods 130 coupled to storage volumes 212 satisfying the previous updated storage properties 216. Target environment 102 may therefore include a combination of one or more of pods 130 that have not been replaced (e.g., pods 130B and 130C in FIG. 1) and one or more replacement application pods 130 (e.g., pod 130D in FIG. 1) when process 400 is restarted. As a result of being able to restart process 400 without first completing it, continual changes may be made to storage properties 216 associated with pods 130 without having to wait for process 400, which can potentially take days to complete.

Figure 5:
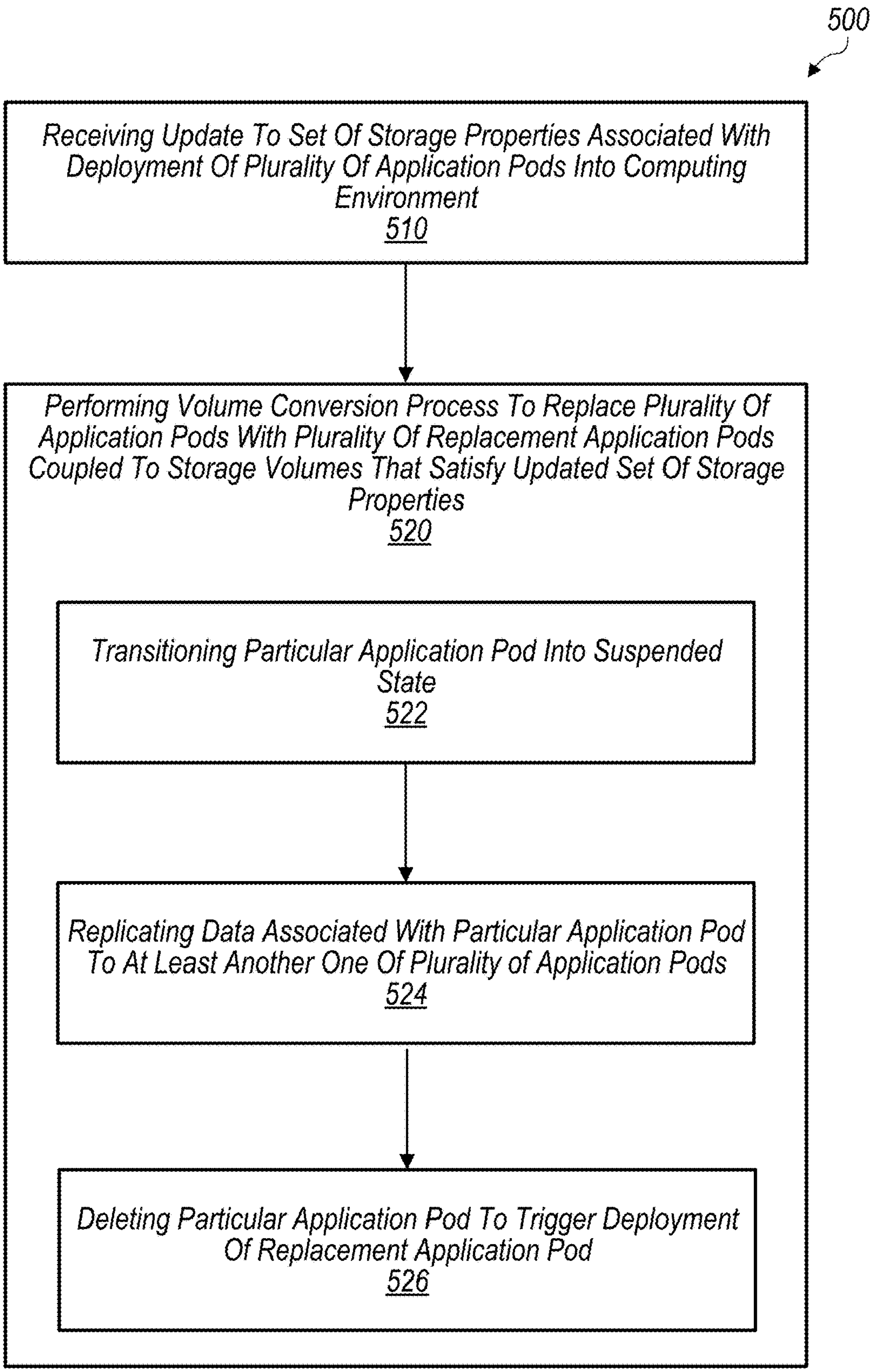
FIG. 5 is a flow diagram illustrating an example method relating to replacing pods with replacement pods coupled to storage volumes that satisfy an updated set of storage properties, according to some embodiments.

Turning now to FIG. 5, a flow diagram of a method 500 is shown. Method 500 is one embodiment of a method performed by a computer system (e.g., system 100) to replace pods (e.g., pods 130) with replacement pods that are coupled to storage volumes (e.g., volumes 212) that satisfy an updated set of storage properties (e.g., storage properties 216). In some cases, method 500 can be performed by executing program instructions that are stored on a computer-readable medium. For example, a computer system having at least one processor may execute program instructions stored in a memory of the computer system to perform method 500. In some embodiments, method 500 includes more or less steps than shown. For example, method 500 may include a step in which the computer system acquires a lock on the deployment of the pods to prevent another operation from being performed on the deployment while the lock is held.

Method 500 begins in step 510 with the computer system receiving an update to a set of storage properties associated with a deployment of a plurality of application pods into a distributed computing environment (e.g., target environment 102) by a deployment system (e.g., deployment system 104). A given one of the plurality of application pods may be coupled to a storage volume that satisfies the set of storage properties. The update may be an update to at least one of a volume size, a volume type, an IOPS, a throughput, or a combination thereof.

In step 520, the computer system performs a volume conversion process (e.g., volume conversion process 400) to replace the plurality of application pods with a plurality of replacement applications pods coupled to storage volumes that satisfy an updated set of storage properties that corresponds to the update. The volume conversion process includes steps 522, 524, and 526, which may be performed for each of the plurality of pods (e.g., all the pods that are children to statefulset 140B with the updated set of storage properties).

At step 522, the computer system transitions a particular application pod of the plurality of pods into a suspended state (e.g., step 408 in FIG. 4) in which the particular application pod is unavailable for data access. To transition the particular pod into the suspended state, in various embodiments, the computer system writes, to a storage volume accessible to the particular application pod, a marker that prevents the particular application pod from completing a boot sequence. The computer system restarts the particular application pod to cause the particular application pod to enter the suspended state during the boot sequence.

At step 524, the computer system replicates data associated with the particular application pod to at least another one of the plurality of application pods. In various cases, the computer system identifies other pods storing copies of the data and replicates the data from one or more of the identified other pods instead of from the particular application pod to the at least one other application pod. In some cases, the data is replicated from the particular pod to the at least one other pod. An auto replicator (e.g., auto replicator 320) may replicate the data associated with the suspended pod based on the number of times indicated by a replication factor.

At step 524, after the replicating of the data, the computer system deletes the particular application pod to trigger the deployment system to provision a replacement application pod coupled to a storage volume that satisfies the updated set of storage properties. For example, after a pod has its data replicated (e.g., via auto replicator 320), the pod may be deleted and a new replacement pod (e.g., pod 130D replacing pod 130A) may be provisioned with a new storage object (e.g., a PVC 208) and a newly provisioned storage volume (e.g., a volume 212) that satisfies the updated set of storage properties.

The volume conversion process may include additional steps. In various embodiments, the computer system deletes, via the deployment system, a first statefulset (e.g., statefulset 140A) upon the receiving of the update to the set of storage properties. The computer system may create, via the deployment system, a second statefulset (e.g., statefulset 140B) associated with the updated set of storage properties. Ones of the plurality of application pods may be assigned a label that binds them to the first statefulset. When the first statefulset is deleted, the plurality of application pods may be orphaned. The second statefulset may be associated with the label to cause the plurality of application pods to be bound to the second statefulset and no longer orphaned. In some embodiments, the particular application pod is bound to a particular storage volume via a storage object (e.g., a PVC 208) that describes the set of storage properties and prevents that storage volume from being deallocated when the particular application pod is deleted. The volume conversion process may include marking the storage object for deletion prior to deleting the particular application pod.

During the volume conversion process, the computer system may detect one or more operations (e.g., an image update to a node 120) pertaining to the plurality of application pods that have a higher priority than the volume conversion process. In various embodiments, the computer system yields the performance of the volume conversion process to the one or more operations having the higher priority. In some cases, the computer system determines that the replicating of the data to the at least one other application pod has not completed when the one or more operations are detected—e.g., step 422 of FIG. 4. After the determining, the computer system can transition the particular application pod into an unsuspended state in which the particular application pod resumes processing requests for the data—e.g., step 418 of FIG. 4. In some cases, the computer system determines that the replicating of the data has completed but a plurality of operations (e.g., deleting the pod and provisioning the replacement pod) that occur after the replicating of the data has not completed when the one or more operations are detected. In various embodiments, the computer system permits the plurality of operations to complete before yielding the performance of the volume conversion process to the one or more operations.

In various embodiments, the computer system acquires a lock on the plurality of application pods that prevents other operations that affect the deployment of the plurality of application pods from being performed. Accordingly, the yielding may include releasing the lock to permit the one or more operations to be performed on the plurality of application pods. The computer system may resume the volume conversion process after the completion of the one or more operations having the higher priority. In some cases, the computer system receives an update to the updated set of storage properties that results in a subsequent updated set of storage properties. When the update is received, the computing environment may include a combination of one or more of the application pods that have not be replaced and one or more of the plurality of replacement application pods. In various embodiments, the computer system restarts the volume conversion process to replace application pods of the combination with a plurality of replacement applications pods coupled to storage volumes that satisfy the subsequent updated set of storage properties.

Exemplary Computer System

Figure 6:
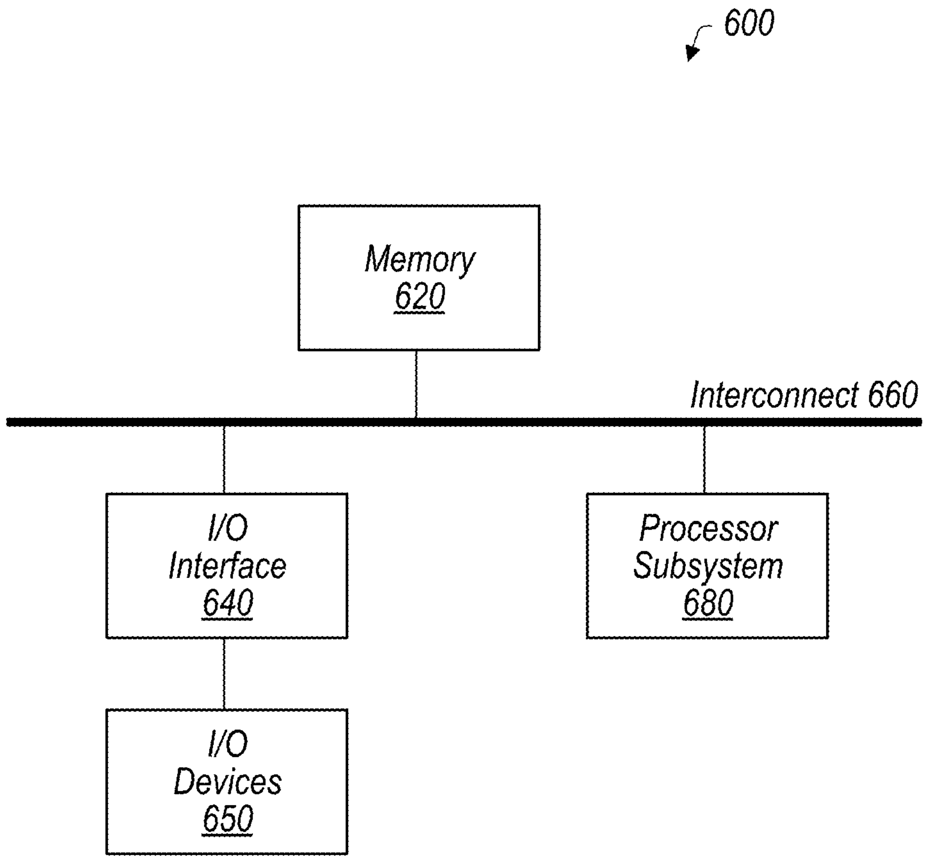
FIG. 6 is a block diagram illustrating elements of a computer system for implementing various systems described in the present disclosure, according to some embodiments.

Turning now to FIG. 6, a block diagram of an exemplary computer system 600, which may implement system 100, deployment system 104, storage upgrade controller 108, and/or target environment 102 is depicted. Computer system 600 includes a processor subsystem 680 that is coupled to a system memory 620 and I/O interfaces(s) 640 via an interconnect 660 (e.g., a system bus). I/O interface(s) 640 is coupled to one or more I/O devices 650. Although a single computer system 600 is shown in FIG. 6 for convenience, system 600 may also be implemented as two or more computer systems operating together.

Processor subsystem 680 may include one or more processors or processing units. In various embodiments of computer system 600, multiple instances of processor subsystem 680 may be coupled to interconnect 660. In various embodiments, processor subsystem 680 (or each processor unit within 680) may contain a cache or other form of on-board memory.

System memory 620 is usable store program instructions executable by processor subsystem 680 to cause system 600 perform various operations described herein. System memory 620 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 600 is not limited to primary storage such as memory 620. Rather, computer system 600 may also include other forms of storage such as cache memory in processor subsystem 680 and secondary storage on I/O Devices 650 (e.g., a hard drive, storage array, etc.). In some embodiments, these other forms of storage may also store program instructions executable by processor subsystem 680. In some embodiments, program instructions that when executed implement an application 135, a pod 130, deployment system 104, and/or storage upgrade controller 108 may be included/stored within system memory 620.

I/O interfaces 640 may be any of various types of interfaces configured to couple to and communicate with other devices, according to various embodiments. In one embodiment, I/O interface 640 is a bridge chip (e.g., Southbridge) from a front-side to one or more back-side buses. I/O interfaces 640 may be coupled to one or more I/O devices 650 via one or more corresponding buses or other interfaces. Examples of I/O devices 650 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 600 is coupled to a network via a network interface device 650 (e.g., configured to communicate over WiFi, Bluetooth, Ethernet, etc.).

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of. . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to"

perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:

receiving, by a computer system, an update to a set of storage properties associated with a deployment of a plurality of application pods into a computing environment by a deployment system, wherein a given one of the plurality of application pods is coupled to a storage volume that satisfies the set of storage properties; and performing, by the computer system, a volume conversion process to replace the plurality of application pods with a plurality of replacement applications pods coupled to storage volumes that satisfy an updated set of storage properties that corresponds to the update, wherein the volume conversion process includes, for a particular one of the plurality of application pods:

transitioning the particular application pod into a suspended state in which the particular application pod is unavailable for data access;

replicating data associated with the particular application pod to at least another one of the plurality of application pods; and after the replicating of the data, deleting the particular application pod to trigger the deployment system to provision a replacement application pod that is coupled to a storage volume that satisfies the updated set of storage properties.

2. The method of claim 1, wherein the replicating of the data associated with the particular application pod includes:

identifying other pods storing copies of the data; and replicating the data from one or more of the identified other pods to the at least another application pod.

3. The method of claim 1, further comprising:

detecting, by the compute system, an operation pertaining to the plurality of application pods and having a higher priority than the volume conversion process;

yielding, by the compute system, performance of the volume conversion process to the operation having the higher priority; and resuming, by the compute system, the volume conversion process after completion of the operation having the higher priority.

4. The method of claim 3, wherein the yielding includes:

determining that the replicating of the data to the at least another application pod has not completed when the operation having the higher priority is detected; and after the determining, transitioning the particular application pod into an unsuspended state in which the particular application pod resumes processing requests for the data.

5. The method of claim 3, wherein the volume conversion process includes a plurality of operations that is performed in relation to the particular application pod after the replicating of the data, and wherein the yielding includes:

determining that the replicating of the data has completed but the plurality of operations has not completed when the operation having the higher priority is detected; and after the determining, permitting the plurality of operations to complete before yielding the performance of the volume conversion process to the operation having the higher priority.

6. The method of claim 3, wherein the volume conversion process includes:

acquiring a lock on the plurality of application pods that prevents, while the lock is held, other operations that affect the deployment of the plurality of application pods from being performed, wherein the yielding includes releasing the lock to permit the operation to be performed on the plurality of application pods.

7. The method of claim 1, wherein the plurality of application pods is managed as part of a first statefulset in the deployment system, and wherein the method further comprises:

deleting, by the computer system via the deployment system, the first statefulset upon the receiving of the update to the set of storage properties, wherein the deleting includes instructing the deployment system to delete the first statefulset but not the plurality of application pods; and creating, by the computer system via the deployment system, a second statefulset that is associated with the updated set of storage properties, wherein the plurality of application pods is managed as part of the second statefulset.

8. The method of claim 7, wherein ones of the plurality of application pods are assigned a label that binds the plurality of application pods to the first statefulset, and wherein the second statefulset is associated with the label to cause the plurality of application pods to be bound to the second statefulset.

9. The method of claim 1, wherein the particular application pod is bound to a particular storage volume via a storage object that describes the set of storage properties and prevents the particular storage volume from being deallocated when the particular application pod is deleted, and wherein the volume conversion process includes marking the storage object for deletion prior to deleting the particular application pod.

10. The method of claim 1, further comprising:

receiving, by the computer system, an update to the updated set of storage properties that results in a subsequent updated set of storage properties, wherein the computing environment includes a combination of one or more of the application pods and one or more of the plurality of replacement application pods; and restarting, by the computer system, the volume conversion process to replace application pods of the combination with a plurality of replacement applications pods coupled to storage volumes that satisfy the subsequent updated set of storage properties.

11. The method of claim 1, wherein the set of storage properties identifies at least one of a volume size, a volume type, an input/output operations per second, and a throughput.

12. A non-transitory computer readable medium having program instructions stored thereon that are capable of causing a computer system to perform operations comprising:

receiving an update to a set of storage properties associated with a deployment of a plurality of application pods into a computing environment by a deployment system, wherein a given one of the plurality of application pods is coupled to a storage volume that satisfies the set of storage properties; and performing a volume conversion process to replace the plurality of application pods with a plurality of replacement applications pods coupled to storage volumes that satisfy an updated set of storage properties that corresponds to the update, wherein the volume conversion process includes, for a particular one of the plurality of application pods:

transitioning the particular application pod into a suspended state in which the particular application pod is unavailable for data access;

replicating data associated with the particular application pod to at least another one of the plurality of application pods; and after the replicating of the data, deleting the particular application pod to trigger the deployment system to provision a replacement application pod that is coupled to a storage volume that satisfies the updated set of storage properties.

13. The non-transitory computer readable medium of claim 12, wherein the operations further comprise:

detecting one or more operations to be performed on the deployment of the plurality of application pods and having a higher priority than the volume conversion process; and yielding performance of the volume conversion process to the one or more operations, wherein the yielding includes transitioning the particular application pod into an unsuspended state in response to determining that the replicating of the data has not completed when the one or more operations are detected.

14. The non-transitory computer readable medium of claim 12, wherein the operations further comprise:

detecting one or more operations to be performed on the deployment of the plurality of application pods and having a higher priority than the volume conversion process; and yielding performance of the volume conversion process to the one or more operations, wherein the yielding includes permitting a plurality of operations occurring after the replicating of the data to be performed in response to determining that the replicating has completed but the plurality of operations has not completed when the one or more operations are detected.

15. The non-transitory computer readable medium of claim 12, wherein the plurality of application pods is managed as part of a first statefulset, and wherein the operations further comprise:

deleting the first statefulset upon the receiving of the update; and creating a second statefulset that is associated with the updated set of storage properties and the plurality of application pods, wherein the second statefulset includes a reference to a storage class that specifies one or more of the updated set of storage properties.

16. The non-transitory computer readable medium of claim 12, wherein the transitioning of the particular application pod into the suspended state includes:

writing, to a storage volume accessible to the particular application pod, a marker that prevents the particular application pod from completing a boot sequence; and restarting the particular application pod to cause the particular application pod to enter the suspended state during the boot sequence.

17. A system, comprising:

at least one processor; and memory having program instructions stored thereon that are executable by the at least one processor to cause the system to perform operations comprising:

receiving an update to a set of storage properties associated with a deployment of a plurality of application pods into a computing environment by a deployment system, wherein a given one of the plurality of application pods is coupled to a storage volume that satisfies the set of storage properties; and performing a volume conversion process to replace the plurality of application pods with a plurality of replacement applications pods coupled to storage volumes that satisfy an updated set of storage properties that corresponds to the update, wherein the volume conversion process includes, for a particular one of the plurality of application pods:

transitioning the particular application pod into a suspended state in which the particular application pod is unavailable for data access;

replicating data associated with the particular application pod to at least another one of the plurality of application pods; and after the replicating of the data, deleting the particular application pod to trigger the deployment system to provision a replacement application pod that is coupled to a storage volume that satisfies the updated set of storage properties.

18. The system of claim 17, wherein the replicating of the data includes:

identifying other pods storing copies of the data; and replicating the data from one or more of the identified other pods instead of from the particular application pod to the at least another application pod.

19. The system of claim 17, wherein the operations further comprise:

acquiring a lock on the plurality of application pods that prevents other operations that affect the deployment of the plurality of application pods from being performed; and yielding performance of the volume conversion process to an operation having a higher priority than the volume conversion process, wherein the yielding includes releasing the lock to permit the operation to be performed on the plurality of application pods.

20. The system of claim 17, wherein the operations further comprise:

receiving, while performing the volume conversion process, a different updated set of storage properties, wherein the computing environment includes a combination of one or more of the application pods and one or more of the plurality of replacement application pods; and restarting the volume conversion process to replace application pods of the combination with a plurality of replacement applications pods coupled to storage volumes that satisfy the different updated set of storage properties.

* * * * *